United States Patent
Seo et al.

(10) Patent No.: US 7,376,998 B2
(45) Date of Patent: May 27, 2008

(54) METHOD FOR CONTROLLING DRIVING OF DRUM-TYPE WASHING MACHINE AND APPARATUS THEREOF

(75) Inventors: Hyun-Seok Seo, Incheon (KR); Tae-Hee Lee, Seoul (KR); Byung-Keol Choi, Bucheon (KR); Sang-Wook Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 644 days.

(21) Appl. No.: 10/752,003

(22) Filed: Jan. 7, 2004

(65) Prior Publication Data
US 2004/0139557 A1    Jul. 22, 2004

(30) Foreign Application Priority Data
Jan. 16, 2003   (KR) ............ 10-2003-0003028

(51) Int. Cl.
*D06F 33/02*    (2006.01)
(52) U.S. Cl. .................. 8/159; 68/12.06; 68/12.19
(58) Field of Classification Search ........... 68/12.02, 68/12.06, 12.19; 8/159
See application file for complete search history.

(56) References Cited

U.S. PATENT DOCUMENTS

| | | | |
|---|---|---|---|
| 4,631,771 A | * | 12/1986 | Anderson et al. ........... 8/158 |
| 4,843,671 A | * | 7/1989 | Hirooka et al. ............. 8/159 |
| 5,171,435 A | * | 12/1992 | Nishimura et al. ......... 34/58 |
| 6,612,138 B2 | | 9/2003 | Ryu et al. |
| 6,615,619 B2 | | 9/2003 | Kakuda et al. |
| 7,039,976 B2 | * | 5/2006 | Sears ......................... 8/159 |

FOREIGN PATENT DOCUMENTS

| | | | |
|---|---|---|---|
| FR | 2 531 461 | * | 2/1984 |
| GB | 2 270 373 | * | 2/1994 |
| JP | 4-38994 | * | 2/1992 |
| JP | 4-150894 | * | 5/1992 |
| JP | 5-277288 | * | 10/1993 |
| JP | 11-164991 | * | 6/1999 |
| JP | 11-169581 | * | 6/1999 |
| JP | 2000-308797 | * | 11/2000 |
| JP | 2001-276468 A | | 10/2001 |
| WO | WO-01/59196 A1 | | 8/2001 |

OTHER PUBLICATIONS

European Patent Office 1 167 612 Feb. 2002.*

* cited by examiner

*Primary Examiner*—Frankie L. Stinson
(74) *Attorney, Agent, or Firm*—Birch, Stewart, Kolasch & Birch, LLP

(57) ABSTRACT

Disclosed are a method for controlling a driving of a drum type washing machine preventing vibration and noise of a drum, reducing a usage of washing water, and reducing rinse time, and an apparatus thereof. To this end, the drum is rotated with a preset equilibrium speed faster than a speed that vibration of the drum is excessively generated accordingly as a rotation speed of the drum is decreased when a dewatering process of laundry is completed, and washing water is supplied into the drum type washing machine while maintaining the drum as the preset equilibrium speed.

9 Claims, 4 Drawing Sheets

METHOD FOR CONTROLLING DRIVING OF DRUM-TYPE WASHING MACHINE AND APPARATUS THEREOF

This Nonprovisional application claims priority under 35 U.S.C. § 119(a) on Patent Application No(s). 10-2003-0003028 filed in KOREA on Jan. 16, 2003, the entire contents of which are hereby incorporated by reference.

BACKGROUND OF THE INVENTION

1. Field of the Invention

The present invention relates to a washing machine, and more particularly, to a method for controlling a driving of a drum-type washing machine and an apparatus thereof.

2. Description of the Conventional Art

Generally, a washing machine is a mechanical apparatus for washing laundry by performing a washing process, a rinse process, and a dewatering process. The washing machine is divided into a pulsator method, an agitation method, a drum method, and etc. according to a washing method. Hereinafter, a general drum type washing machine will be explained with reference to FIG. 1.

FIG. 1 is a sectional view showing a construction of a drum type washing machine in accordance with the conventional art.

As shown, the drum type washing machine comprises a casing 12, a tub 17 arranged in the casing 12, and a drum 15 rotatably arranged in the tub 17.

Hereinafter, a construction of the drum type washing machine according to the conventional art will be explained in more detail.

The casing 12 has a rectangular parallelepiped shape, and an aperture 22 through which laundry is put in/out is formed at a front side of the casing 12. A door 23 for opening and closing the aperture 22 is disposed at a lateral surface of the aperture 22. The tub 17 for accommodating washing water is installed in the casing 12, and a supporting spring 11 and a damper 18 for shock-absorbingly supporting the tub 17 are respectively installed at upper and lower sides of the tub 17.

A spider 13 for rotatably supporting the drum 15 is coupled to a rear side of the tub 17, and a drum driving motor 14 for rotating the drum 15 is integrally coupled to a rear lateral surface of the spider 13.

A water supply pipe and a water supply valve (not shown) for supplying washing water into the tub 17 are installed at an upper portion of the tub 17, and a drain pump 19 for draining washing water through a drain pipe 16 is installed at a lower portion of the tub 17.

A cyclic water pipe 20 for taking out washing water inside the tub 17 and circulating the taken washing water into the upper portion of the tub 17 is installed at one side of the drain pipe 16, and a circulation pump 21 for pumping washing water is installed at the cyclic water pipe 20.

According to this, when laundry is received in the drum 15 and detergent and washing water are supplied thereto, a control unit (not shown) controls the drum driving motor 14 thus to rotate the drum 15 and drives the circulation pump 21 thus to circulate washing water.

Then, when the washing process is completed, the control unit controls the drain pump 19 and the drum driving motor 14 thus to perform a drain process and a dewatering process in turn and supplies washing water into the tub 17 thus to perform a rinse process several times. Herein, the rinse process is performed several times, and whenever the rinse process is performed one time, the drain process and the dewatering process are also performed one time.

When the dewatering process is performed in a state that laundry is arranged with eccentricity in the drum 15, the drum 15, the tub 17, and a supporting component for the drum 15 (not shown) are damaged and forcibly abraded. Accordingly, in order to prevent the damage and forcible abrasion, an amount of eccentricity of the drum 15 has to be detected before the dewatering process and when the amount of eccentricity is less than a preset reference value, the dewatering process has to be performed.

However, in the conventional drum type washing machine, when the dewatering process is completed after the washing process, or when the dewatering process is completed after the rinse process, a rotation speed of the drum is gradually decreased and the drum is stopped. According to this, vibration and noise are generated at a speed section where vibration of the drum 15 is drastically increased (for example, 150~200 rpm (revolution per minute)).

Also, in the conventional drum type washing machine, an amount of eccentricity of the drum 15 is detected in a state that the drum 15 is rotated with a speed which is a little increased than a rotation speed of the drum 15 at the time of a washing process after the drum 15 is completely stopped after the washing process is performed, so that vibration and noise are generated at a speed section where vibration of the drum 15 is drastically increased (for example, 150~200 rpm (revolution per minute)).

Besides, in the conventional drum type washing machine, when the detected amount of eccentricity exceeds the preset reference value (a reference value of an amount of eccentricity of the drum), the drum 15 is stopped and then is driven again, which is repeatedly performed several times or a dozen times. According to this, it takes a lot of time to detect an amount of eccentricity of the drum 15 and then to proceed to a next step by making the amount of eccentricity be less than the preset reference value.

Besides, in the drum type washing machine according to the conventional art, an amount of eccentricity of the drum 15 is detected at a low speed and when the detected amount of eccentricity is less than the preset reference value, a rotational speed of the drum 15 is increased. According to this, the amount of eccentricity of the drum is again increased thus to cause vibration and noise.

In addition, in the drum type washing machine according to the conventional art, the time taken to rinse laundry with washing water is less than the time taken to supply washing water in order to rinse laundry, so that much washing water is put into the tub 17 and time for performing the rinse process is increased.

Minute explanations for the drum type washing machine according to the conventional art are also disclosed in U.S. Pat. Nos. 6,615,619 and 6,612,138.

SUMMARY OF THE INVENTION

Therefore, an object of the present invention is to provide a method for controlling a driving of a drum type washing machine capable of preventing vibration and noise and an apparatus thereof.

Another object of the present invention is to provide a method for controlling a driving of a drum type washing machine capable of reducing a usage of washing water and an apparatus thereof.

To achieve these and other advantages and in accordance with the purpose of the present invention, as embodied and broadly described herein, there is provided a method for controlling a driving of a drum type washing machine comprising the steps of: rotating a drum with a preset speed faster than a speed that vibration of the drum is excessively generated accordingly as a rotation speed of the drum is decreased when a dewatering process of laundry is completed; and maintaining the preset speed and supplying washing water into the drum type washing machine.

In the method for controlling a driving of a drum type washing machine according to the present invention, a rinse process is performed in a state that a rotation speed of the drum is maintained as a preset speed.

To achieve these and other advantages and in accordance with the purpose of the present invention, as embodied and broadly described herein, there is also provided an apparatus for controlling a driving of a drum type washing machine comprising: a drum driving motor for rotating a drum of a drum type washing machine; a water supply valve for supplying washing water into the drum type washing machine; and a control unit for rotating the drum through the drum driving motor with a preset speed faster than a speed that vibration of the drum is excessively generated accordingly as a rotation speed of the drum is decreased when a dewatering process of laundry is completed.

Herein, the control unit maintains a rotation speed of the drum as a preset speed and supplies washing water into the drum type washing machine through the water supply valve.

To achieve these and other advantages and in accordance with the purpose of the present invention, as embodied and broadly described herein, there is provided an apparatus for controlling a driving of a drum type washing machine comprising: a drum driving motor for rotating a drum of a drum type washing machine; a water supply valve for opening and closing a water supply pipe which supplies washing water into a tub of the drum type washing machine; and a control unit for rotating the drum through the drum driving motor with a preset equilibrium speed faster than a speed that vibration of the drum is excessively generated accordingly as a rotation speed of the drum is decreased when a dewatering process after a washing process is completed or when a dewatering process after a rinse process is completed, the control unit for simultaneously supplying washing water for a rinse process into the tub through the water supply valve.

To achieve these and other advantages and in accordance with the purpose of the present invention, as embodied and broadly described herein, there is also provided a method for controlling a driving of a drum type washing machine comprising the steps of: rotating a drum with a preset equilibrium speed faster than a speed that vibration of the drum is excessively generated accordingly as a rotation speed of the drum is decreased when a dewatering process after a washing process is completed or when a dewatering process after a rinse process is completed; and rotating the drum with the preset equilibrium speed and supplying washing water for a rinse process into a tub of the drum type washing machine.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
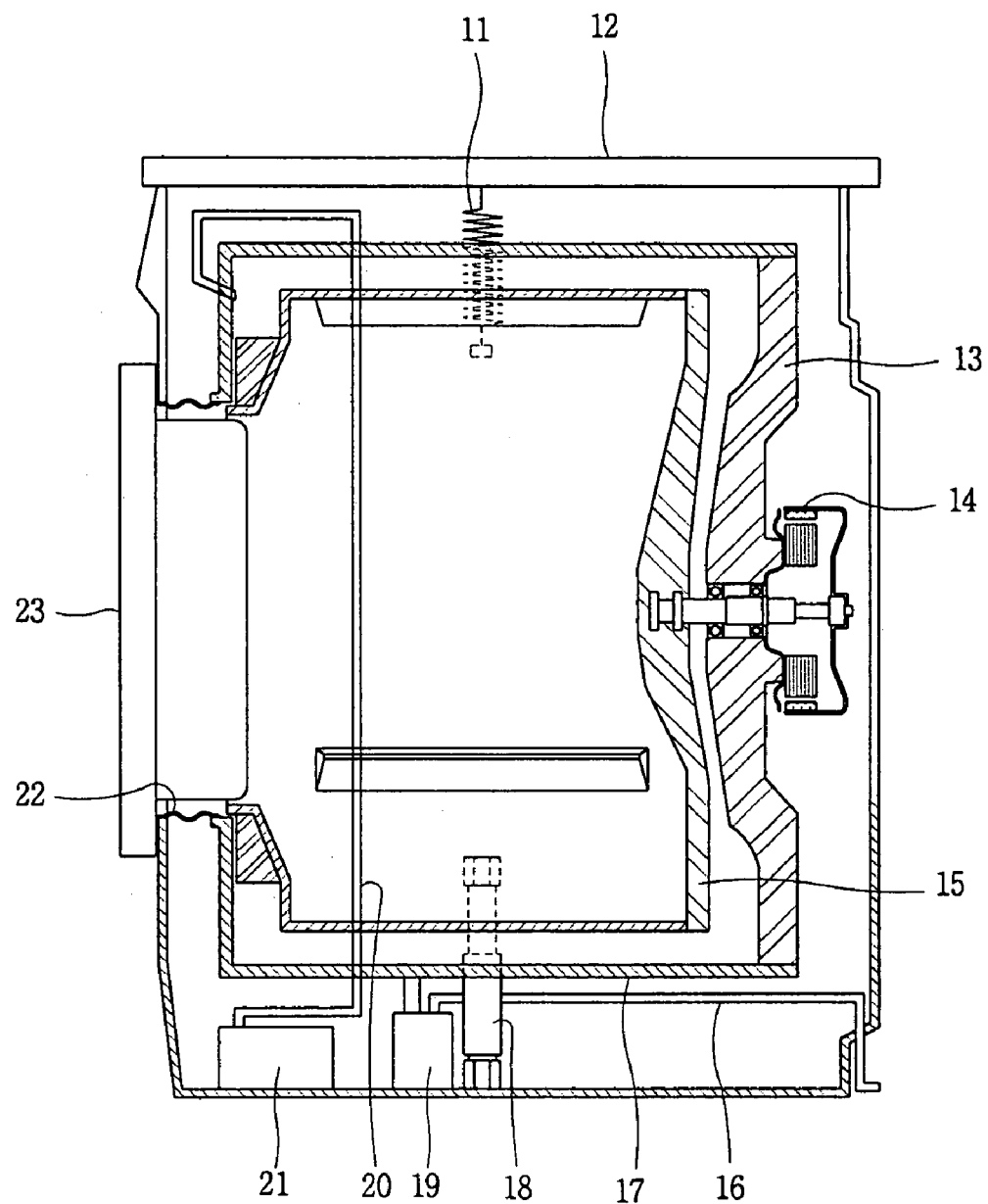
FIG. 1 is a sectional view showing a construction of a drum type washing machine in accordance with the conventional art.

Hereinafter, an apparatus for controlling a driving of a drum type washing machine capable of preventing vibration and noise of a drum, reducing a usage of washing water, and reducing a rinse time by rotating the drum with a preset equilibrium speed (200~500 rpm) faster than a speed (150~200 rpm) that vibration of the drum is excessively generated accordingly as a rotation speed of the drum is decreased when a dewatering process of laundry is completed, by maintaining the drum as the equilibrium speed, and by supplying washing water into the drum type washing machine, and a method thereof will be explained with reference to FIGS. 2 and 3B. Herein, the reference numerals of FIG. 1 will be given to the present invention having the same construction as the conventional art.

Figure 2:
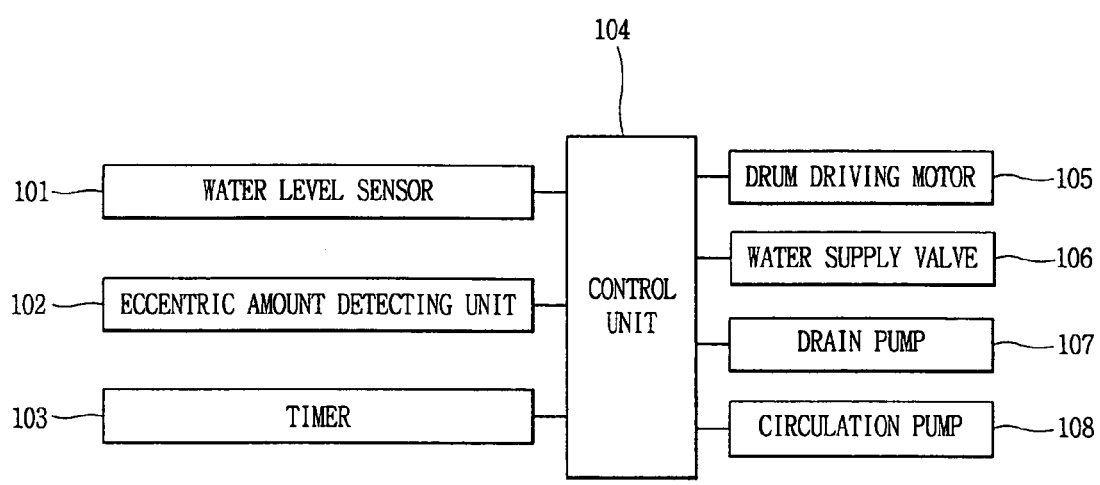
FIG. 2 is a block diagram showing a construction of an apparatus for controlling a driving of a drum type washing machine according to one embodiment of the present invention.

FIG. 2 is a block diagram showing a construction of the apparatus for controlling a driving of the drum type washing machine according to one embodiment of the present invention.

As shown, the apparatus for controlling a driving of a drum type washing machine according to the present invention comprises a drum driving motor 105 for rotating a drum 15 of a drum type washing machine; a water supply valve 106 for opening and closing a water supply valve which supplies washing water into a tub 17 of the drum type washing machine; a drain pump 107 for draining washing water through a drain pipe 16 of the drum type washing machine; a circulation pump 108 for pumping washing water taken out from inside of the tub 17 in order to circulate through a cyclic water pipe 20 of the drum type washing machine; an eccentric amount detecting unit 102 for detecting an amount of eccentricity of the drum 15; a timer 103 for calculating a rinse time; a water level sensor 101 for detecting a level of water supplied into the tub 17; and a control unit 104 for rotating the drum 15 through the drum driving motor 105 with a preset equilibrium speed faster than a speed that vibration of the drum is excessively generated accordingly as a rotation speed of the drum is decreased when a dewatering process is completed, for maintaining the preset equilibrium speed, and for supplying washing water into the tub 17 through the water supply valve 106 in order to efficiently perform a drain process, a rinse process, and a dewatering process without vibration and noise.

Hereinafter, the method for controlling a driving of the drum type washing machine will be explained with reference to FIGS. 3A-3B in more detail.

Figure 3A:
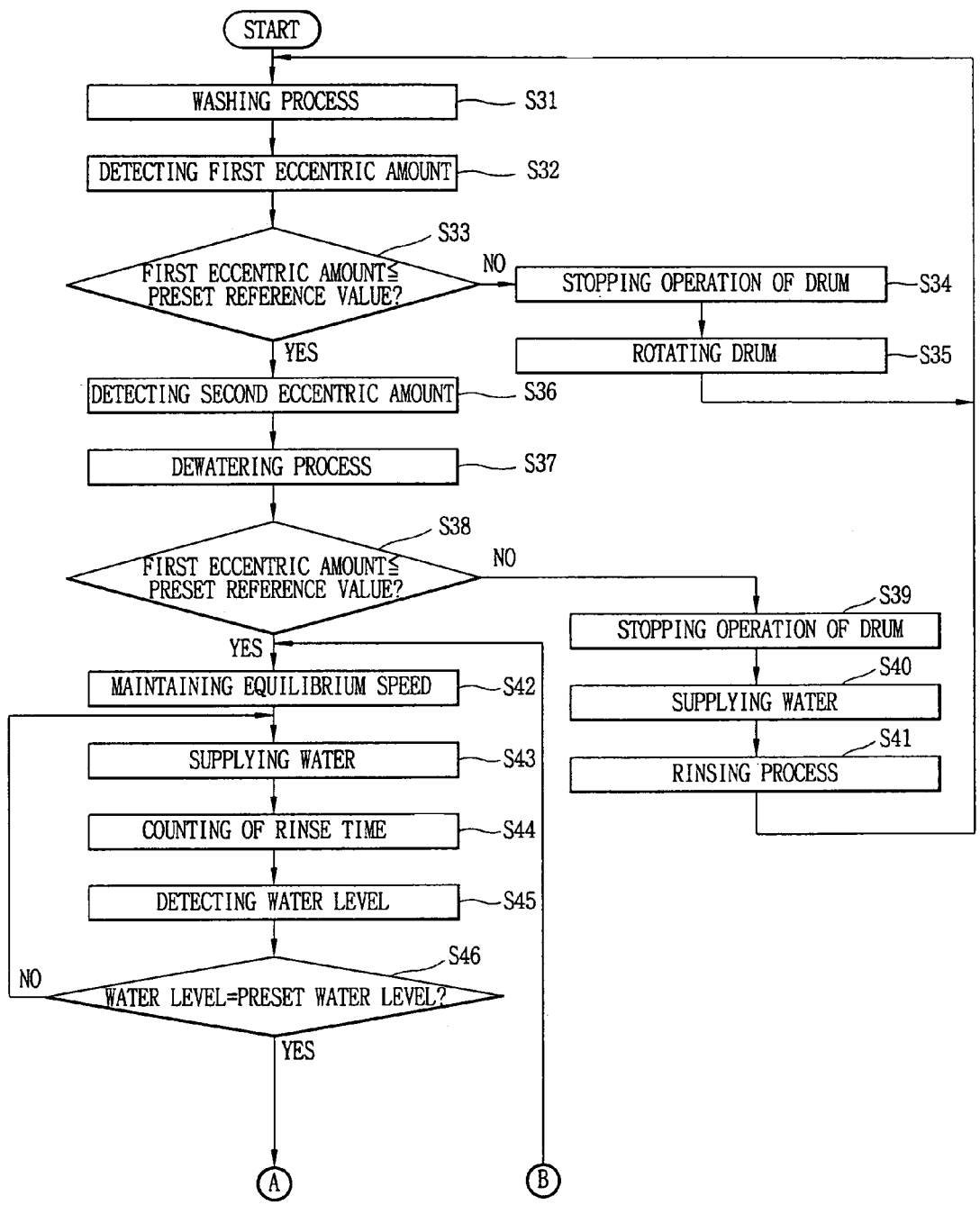
FIGS. 3A-3B are a flow chart showing a method for controlling a driving of a drum type washing machine according to one embodiment of the present invention.
Figure 3B:
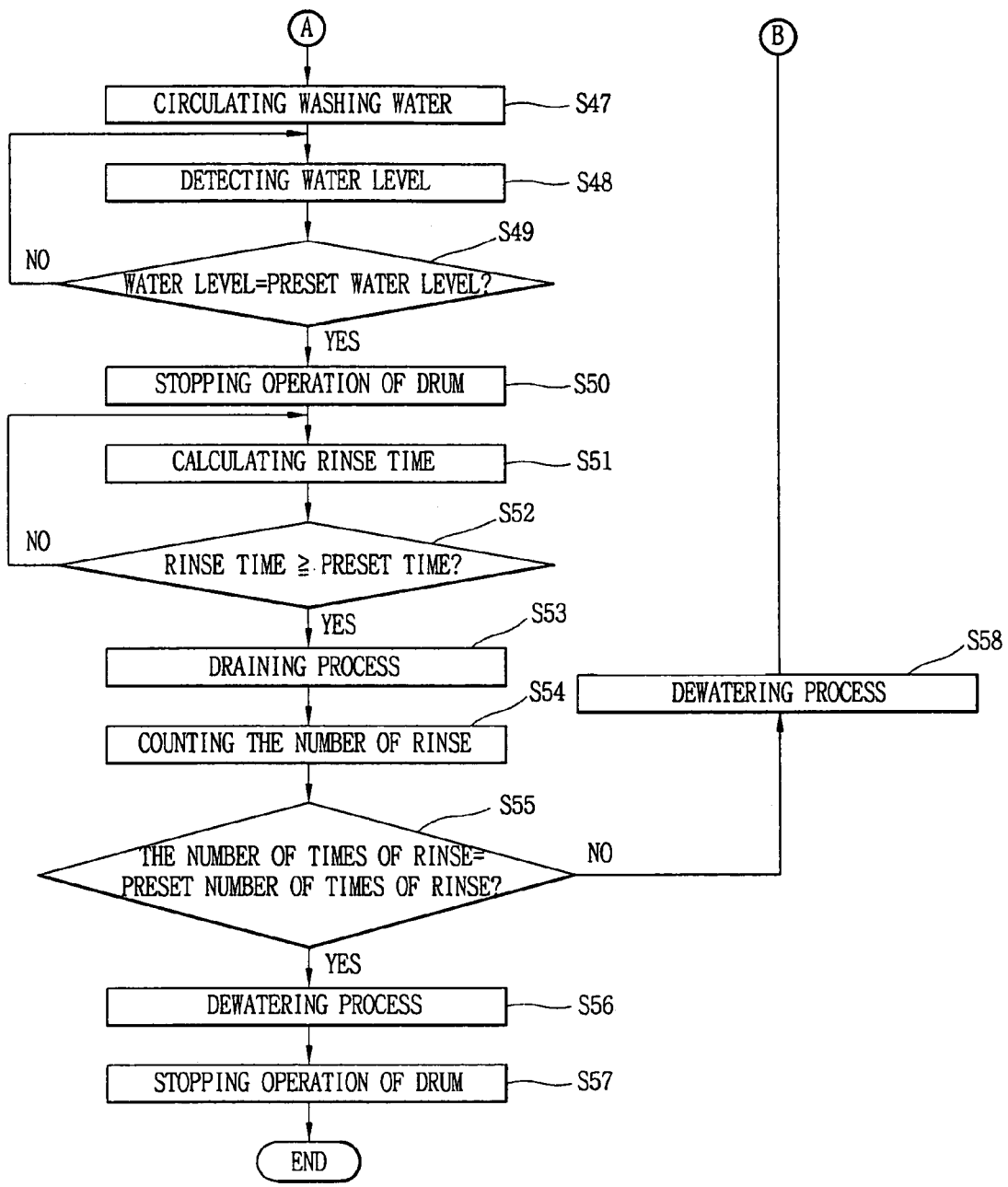

FIGS. 3A-3B are a flow chart showing the method for controlling a driving of the drum type washing machine according to one embodiment of the present invention.

When laundry to be washed is received into the drum 15, the control unit 104 controls the water supply valve 106 so as to supply washing water into the tub 17. At this time, the control unit 104 controls the drum driving motor 14 so that the drum 15 can be clockwise or counterclockwise rotated with a preset rotation speed (for example, 50 rpm), thereby performing a washing process (S31).

When said washing process is completed, the drum driving motor 14 rotates the drum 15 with a first rotation speed (for example, 100 rpm) increased than the original rotation speed at the time of performing the washing process according to a control signal of the control unit 10. At this time, the eccentric amount detecting unit 102 detects a first eccentric amount of the drum 15 at the first rotation speed on the basis of the control signal of the control unit 104 (S32). The eccentric amount detecting unit 102 can detect the eccentric amount by comparing a duty value at the time when the drum 15 is rotated, and the method for detecting the eccentric amount is the same as the conventional one thus to omit its explanations.

When the detected first eccentric amount of the drum 15 is the same as the preset first reference value or exceeds (S33), a driving of the drum 15 is stopped (S34), then the drum 15 is rotated with the first speed (S35), and then the process for detecting the first eccentric amount (S32) is repeatedly performed. That is, the process for driving and stopping the drum 15 is repeatedly performed so that the detected first eccentric amount can be less than the preset first reference value. Herein, the preset reference value means a preset reference eccentric amount, and the reference eccentric amount is preferably about 400 g.

Then, when the detected eccentric amount of the drum 15 is less than the preset reference value (S33), the control unit 104 increases the rotation speed of the drum 15 to a second speed (for example, more than 400 rpm). At this time, the eccentric amount detecting unit 102 detects a second eccentric amount of the drum 15 on the basis of a control signal of the control unit 104 (S36). That is, the control unit 104 rotates the drum 15 until the detected second eccentric amount becomes less than the preset reference value and stops, which is repeatedly performed. Then, when the detected second eccentric amount is less than the preset reference value, the control unit 104 increases the rotation speed of the drum 15 thus to perform a dewatering process (S37).

When the dewatering process (S37) is completed, the drum 15 is not stopped but the rotation speed of the drum is maintained as the first speed (for example, 100 rpm). That is, the first eccentric amount is again detected at the first speed.

When the dewatering process is completed and the detected first eccentric amount exceeds the preset reference value (S38), the control unit 104 respectively controls the drum driving motor 14 and the water supply valve 106 thus to stop the drum 15 (S39), performs a water supply process (S40), and then performs a rinse process (S41). Herein, the rinse process is performed several times, and whenever the rinse process is performed one time, a drain process and a dewatering process are also performed one time. Also, the dewatering process is performed one time after a washing process is completed.

Subsequently, when the rinse process (S41) is completed, the control unit 104 rotates the drum 15 with the first rotation speed thus to detect the first eccentric amount (S32), and detects a second eccentric amount (S36), in which a series of processes (S32~S41) are repeatedly performed.

Meanwhile, when the first eccentric amount of the drum 15 is less than the preset reference value (S38), the control unit 104 maintains the rotation speed of the drum 15 as an equilibrium speed faster than a speed that vibration of the drum 15 is excessively generated, and supplies washing water into the tub 17. For example, when the detected second eccentric amount of the drum 15 is less than the preset reference value (S38), the drum driving motor 14 rotates the drum 15 with 250 rpm (equilibrium speed) on the basis of a control signal of the control unit 104 (S42). At this time, the water supply valve 106 supplies washing water into the tub 17 on the basis of a control signal of the control unit 104 while the drum 15 is rotated with 250 rpm (equilibrium speed) (S43). Herein, the preset equilibrium speed is preferably 250 rpm.

Then, the timer 103 counts a rinse time on the basis of the control signal of the control unit 104 (S44), and the water level sensor 101 detects a level of water supplied into the tub 17 on the basis of a control signal of the control unit 104 (S45).

When the level of washing water supplied into the tub 17 becomes a preset water level (for example, a water level enough to touch a lower portion of the drum 15) (S46), the control unit 104 controls the circulation pump 21 thus to circulate washing water inside the tub 17 (S47). Herein, the control unit 104 continuously supplies washing water in order to prevent a water level from being lowered accordingly as laundry comes into contact with washing water and thereby laundry absorbs washing water.

Whenever a preset time (for example, 30 seconds~60 seconds) lapses, the control unit 104 controls the water level sensor 101 thus to detect a water level (S48), and when the detected water level reaches a preset water level (S49), the control unit 104 controls the water supply valve 106 thus to stop a water supply process (S50).

Next, the control unit 104 calculates a rinse time counted by the timer 103 (S51), and controls the drain pump 19 when the calculated rinse time lapses a preset time (for example, 20 minutes) (S52) thus to perform a drain process (S53). Herein, the control unit 104 controls the drain pump thus to perform a drain process through the drain pipe while the drum is rotated with the preset equilibrium speed.

When the drain process is completed, the control unit 104 counts the number of times of the rinse process (S54), and when the counted number of times of the rinse process is less than a preset number of times of a rinse process (for example, three times) (S55), the control unit 104 increases the equilibrium speed (250 rpm) of the drum 15 into a dewatering speed (for example, 600~1800 rpm) thus to perform a dewatering process (S58). Then, the control unit 104 returns to the step for rotating the drum 15 with 250 rpm (equilibrium speed) (S42). That is, when the dewatering process is completed (S58), the control unit 104 controls the drum driving motor 14 thus to make the drum 15 maintain the preset equilibrium speed (S42) and supplies washing water into the tub 17 (S43) thus to repeatedly perform the rinse processes (S42~S55).

On the contrary, when the counted number of times of the rinse process is the same as the preset number of times of a rinse process (S55), the control unit 104 performs a dewatering process (S56) and stops the drum 15 when the dewatering process is completed (S57).

As aforementioned, in the present invention, when a dewatering process is completed after a washing process or a dewatering process is completed after a rinse process, washing water is supplied at a preset equilibrium speed faster than a speed that vibration of the drum is excessively generated accordingly as a rotation speed of the drum is decreased, thereby performing a rinse process. Therefore, vibration and noise generated by the drum at the time of stopping the drum can be reduced, and time interval between the rinse process and the dewatering process can be reduced.

Besides, in the present invention, the rinse process is performed in a state that the drum is maintained as a preset equilibrium speed properly reduced from a dewatering speed, thereby greatly reducing rinse time.

In addition, in the present invention, a water supply process is performed without stopping the drum and a rinse process is performed by maintaining a water level enough to circulate washing water, thereby greatly reducing an amount of washing water and enhancing a rinse speed.

Besides, in the present invention, before a dewatering process before the first rinse process, an amount of eccentricity of the drum is detected at the second speed (400 rpm) faster than a rotation speed of the drum at the time of a washing process and slower than a rotation speed of the drum at the time of a dewatering process, thereby preventing vibration and noise generated at a speed section between the time of detection of the amount of eccentricity and the time of a dewatering process. According to this, damage and forcible abrasion of the drum, the tub, and the rotation supporting component of the drum due to the amount of eccentricity can be reduced and the drum type washing machine can be stably driven, thereby prolonging a lifespan of the drum type washing machine.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for controlling a driving of a drum type washing machine, comprising:
   dewatering laundry in a drum by rotating the drum with a first preset speed;
   decreasing a speed of the drum to a second preset speed when the dewatering step is completed, the second preset speed being lower than the first preset speed and higher than a speed at which vibration of the drum is excessively generated;
   rotating the drum while maintaining the second preset speed; and
   supplying washing water into the drum type washing machine during the rotating step.

2. The method of claim 1, wherein the second preset speed is 200~500 rpm.

3. The method of claim 1, further comprising performing a rinse process while maintaining a rotation speed of the drum at the second preset speed.

4. A method for controlling a driving of a drum type washing machine, comprising the steps of:
   dewatering laundry in a drum by rotating the drum with a first preset speed;
   decreasing a speed of the drum to a preset equilibrium speed when the dewatering step is completed after a washing process or when the dewatering step is completed after a rinse process, the preset equilibrium speed being lower than the first preset speed and higher than a speed at which vibration of the drum is excessively generated;
   rotating the drum while maintaining the preset equilibrium speed; and
   supplying washing water for performing the rinse process into a tub of the drum type washing machine during the rotating step.

5. The method of claim 4, further comprising draining washing water inside the tub while rotating the drum as the preset equilibrium speed.

6. The method of claim 5, further comprising desiccating by increasing the preset equilibrium speed of the drum when the draining step is completed.

7. The method of claim 4, further comprising:
   detecting a first eccentric amount of the drum at a first speed faster than a rotation speed of the drum at the time of the washing process after the washing process is completed;
   detecting a second eccentric amount of the drum at a second speed faster than the rotation speed of the drum at the time of the washing process and slower than the rotation speed of the drum at the time of the dewatering step; and
   performing the dewatering step when the detected first and second eccentric amounts are less than a preset reference value.

8. The method of claim 7, wherein the second eccentric amount is detected at the second speed when the eccentric amount detected at the first speed is less than the preset reference value, and a driving of the drum is stopped when the eccentric amount detected at the first speed exceeds the preset reference value and then the drum is again driven thus to detect the first eccentric amount at the first speed, which is repeatedly performed.

9. The method of claim 8, further comprising:
   repeatedly performing the rinse step, the drain step, and the dewatering process while maintaining the preset equilibrium speed when the detected second eccentric amount is less than the preset reference value; and
   stopping a driving of the drum, supplying washing water into the tub, and thereby performing the rinse process when the second eccentric amount detected at the second speed exceeds the preset reference value.

* * * * *